(12) United States Patent
Raboach

(10) Patent No.: US 11,612,943 B2
(45) Date of Patent: Mar. 28, 2023

(54) INSERT ADAPTOR AND TURNING TOOL COMPRISING SAME

(71) Applicant: Iscar, Ltd., Tefen (IL)

(72) Inventor: Rafi Raboach, Neve Ziv (IL)

(73) Assignee: Iscar, Ltd., Tefen (IL)

( * ) Notice: Subject to any disclaimer, the term of this patent is extended or adjusted under 35 U.S.C. 154(b) by 369 days.

(21) Appl. No.: 16/528,909

(22) Filed: Aug. 1, 2019

(65) Prior Publication Data

US 2021/0031281 A1 Feb. 4, 2021

(51) Int. Cl.
*B23C 5/22* (2006.01)
*B23B 27/16* (2006.01)
*B23B 29/22* (2006.01)

(52) U.S. Cl.
CPC ............ *B23C 5/22* (2013.01); *B23B 27/1614* (2013.01); *B23B 27/1662* (2013.01); *B23B 29/22* (2013.01); *B23B 2205/16* (2013.01); *B23C 2200/0455* (2013.01); *B23C 2210/16* (2013.01)

(58) Field of Classification Search
CPC ............ B23B 2205/04; B23B 2205/12; B23B 2205/16; B23B 2260/10; B23B 27/1614; B23B 27/1662; B23B 27/1666; B23B 29/22; B23B 27/14; B23B 2205/02; B23C 2200/0455; B23C 2210/16; B23C 5/22; B23C 5/20; B23C 5/2252; B23C 2210/168; Y10T 407/2286; Y10T 407/2274
See application file for complete search history.

(56) References Cited

U.S. PATENT DOCUMENTS

| | | | | |
|---|---|---|---|---|
| 3,066,385 A | * | 12/1962 | Vana | B23B 27/167 407/110 |
| 3,102,326 A | * | 9/1963 | Conti | B23B 27/1677 407/5 |
| 3,299,471 A | | 1/1967 | Hench | |
| 3,332,130 A | * | 7/1967 | Armstrong | B23C 5/2472 407/44 |
| 3,466,721 A | * | 9/1969 | Binns | B23B 27/1666 407/70 |
| 3,548,475 A | * | 12/1970 | Fiori | B23B 27/167 407/6 |
| 3,576,060 A | * | 4/1971 | Stein | B23B 27/002 407/117 |

(Continued)

FOREIGN PATENT DOCUMENTS

CN 201419271 Y 3/2010
DE 102015107919 A1 * 12/2015 ............. B23B 31/02

(Continued)

OTHER PUBLICATIONS

International Search Report dated Nov. 4, 2020, issued in PCT counterpart application (No. PCT/IL2020/050811).

(Continued)

*Primary Examiner* — Sara Addisu
(74) *Attorney, Agent, or Firm* — Womble Bond Dickinson (US) LLP

(57) ABSTRACT

An insert adaptor is configured for providing secure clamping of an insert in an insert pocket. The insert adaptor is configured to be located between an insert and an insert pocket and includes at least one magnetic surface configured for applying a magnetic attraction force to the insert pocket or a shim.

24 Claims, 15 Drawing Sheets

(56) References Cited

U.S. PATENT DOCUMENTS

| | | | | |
|---|---|---|---|---|
| 3,611,527 | A * | 10/1971 | Hudson | B23C 5/2406 407/86 |
| 3,703,755 | A * | 11/1972 | Guensche | B23B 27/1681 407/87 |
| 3,989,077 | A * | 11/1976 | Humbert | B27G 13/04 144/230 |
| 4,035,890 | A * | 7/1977 | Eriksson | B23B 27/1611 407/104 |
| 4,470,442 | A * | 9/1984 | Krautzberger | B27G 13/04 144/172 |
| 4,533,283 | A * | 8/1985 | Satran | B23B 27/1611 407/111 |
| 4,600,341 | A * | 7/1986 | Board | B23B 27/1677 407/104 |
| 4,714,384 | A * | 12/1987 | Lagerberg | B23B 27/1611 407/103 |
| 4,722,642 | A * | 2/1988 | Musacchia, Jr. | B23B 27/1666 407/104 |
| 4,730,525 | A * | 3/1988 | Kelm | B23B 27/1659 82/159 |
| 4,876,932 | A * | 10/1989 | Nessel | B23B 27/1659 82/158 |
| 4,941,245 | A * | 7/1990 | Yamashita | B23D 71/005 279/128 |
| 5,305,811 | A * | 4/1994 | Schaefer | B27L 11/005 144/176 |
| 5,456,300 | A * | 10/1995 | Rosenkranz | B27G 13/04 144/174 |
| 5,586,844 | A * | 12/1996 | Nyman | B23B 27/1677 407/105 |
| 5,669,742 | A * | 9/1997 | Sjoo | B23B 27/065 407/105 |
| 5,685,670 | A * | 11/1997 | Satran | B23C 5/08 407/42 |
| 6,481,936 | B1 * | 11/2002 | Hecht | B23B 27/1662 407/111 |
| 6,623,216 | B2 * | 9/2003 | Hansson | B23B 27/00 407/83 |
| 6,769,843 | B2 * | 8/2004 | Hansson | B23B 27/00 407/91 |
| 7,128,501 | B1 * | 10/2006 | Sipos | B23B 27/167 407/107 |
| 7,163,360 | B2 * | 1/2007 | Toyose | B23C 5/00 407/36 |
| 7,347,650 | B2 * | 3/2008 | Tipu | B23B 27/1662 407/101 |
| 7,390,149 | B2 * | 6/2008 | Wihlborg | B23C 5/06 407/102 |
| 8,327,742 | B1 * | 12/2012 | Austin | B23C 5/2472 82/1.11 |
| 8,403,603 | B2 * | 3/2013 | Zitzlaff | B23B 27/1666 407/107 |
| 9,796,014 | B2 * | 10/2017 | Weyland | B23B 31/06 |
| 2002/0131829 | A1 * | 9/2002 | Persson | B23B 27/1622 407/77 |
| 2005/0232711 | A1 * | 10/2005 | Shaheen | B23B 27/1644 407/107 |
| 2005/0238444 | A1 * | 10/2005 | Virtanen | B23B 29/043 407/110 |
| 2006/0269374 | A1 * | 11/2006 | Dufour | B23C 5/06 409/132 |
| 2006/0275088 | A1 * | 12/2006 | Lehto | B23C 5/1045 407/40 |
| 2007/0065240 | A1 * | 3/2007 | Berger | B23B 29/043 407/117 |
| 2008/0075542 | A1 * | 3/2008 | Van Horssen | B23B 27/1666 407/111 |
| 2008/0112767 | A1 * | 5/2008 | Huang | B23B 27/1666 407/107 |
| 2010/0221076 | A1 * | 9/2010 | Takahashi | B23C 5/06 407/42 |
| 2015/0343582 | A1 * | 12/2015 | Ebihara | B23B 31/28 279/128 |
| 2019/0176244 | A1 * | 6/2019 | Harouche | B23B 29/043 |
| 2021/0197298 | A1 * | 7/2021 | Hen | B23C 5/2252 |

FOREIGN PATENT DOCUMENTS

| | | |
|---|---|---|
| EP | 0 499 132 A2 | 8/1992 |
| EP | 1 529 612 A1 | 5/2005 |
| JP | 2001-347404 A | 12/2001 |

OTHER PUBLICATIONS

Written Opinion dated Nov. 4, 2020, issued in PCT counterpart application (No. PCT/IL2020/050811).

* cited by examiner

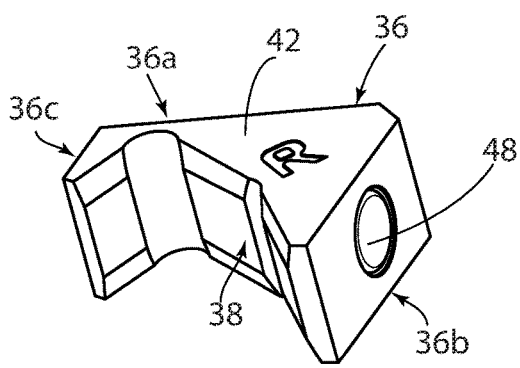 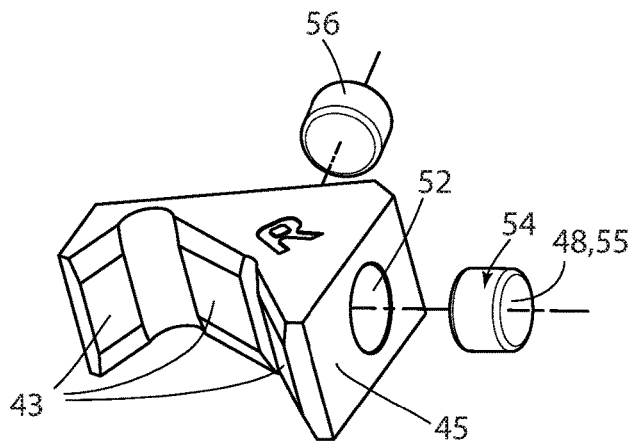
Fig.39  Fig.40
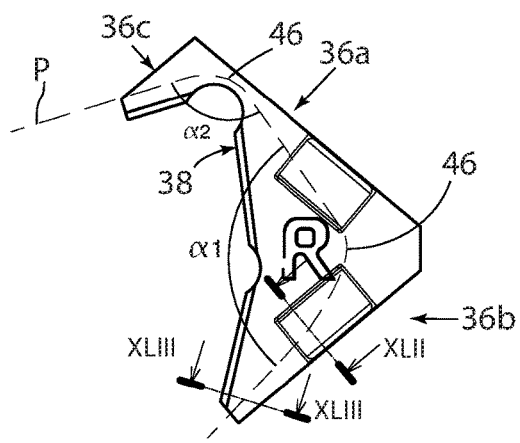 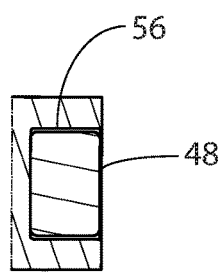 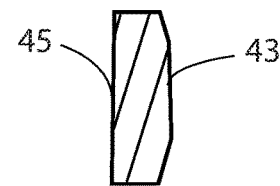
Fig.41  Fig.42  Fig.43
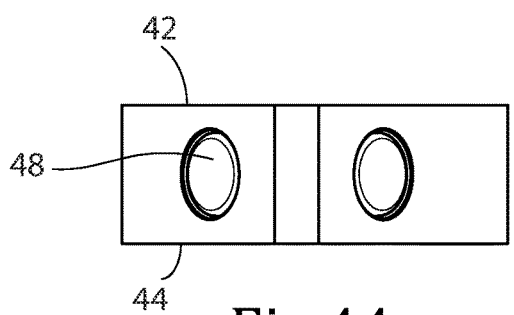 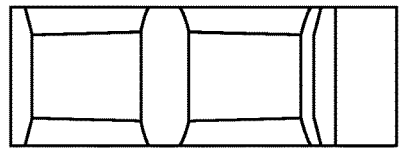
Fig.44  Fig.45

INSERT ADAPTOR AND TURNING TOOL COMPRISING SAME

FIELD OF THE INVENTION

The subject matter of the present application relates to an insert adaptor configured to be inserted in an insert pocket of a cutting tool. Specifically, it relates to an insert adaptor configured for adapting a pocket of a standard turning tool into a pocket configured to hold a smaller insert.

BACKGROUND OF THE INVENTION

According to most present technologies and standards, an insert pocket is typically designed for securing a cutting insert of a single geometry and size. Notably the word "insert" in the present specification and claims is a shortened name for a cutting insert for machining, typically made of cemented carbide. Similarly, the name "insert adaptor" is an adaptor configured for use with a cutting insert in a cutting insert pocket.

Despite the norm of an insert pocket designed for a single geometry and size of insert, there are of course exceptions, at least in patent literature. For example, U.S. Pat. No. 8,807,884 discloses an insert pocket designed to accommodate two different insert geometries.

The present invention differs substantially from U.S. Pat. No. 8,807,884 in that it is not directed to an insert pocket integrally formed with a tool's insert holder itself but rather an insert adaptor designed to be inserted in an insert pocket between an insert and said insert pocket.

U.S. Pat. No. 4,722,642 discloses a spacing adaptor configured to separate an insert from walls of an insert pocket of a turning tool. The portions of the spacing adaptor which separate the inserts from the pocket walls are connected by a weakened portion which may be scored or reduced in dimension. The adaptor, as manufactured, is flat with the weakened portion connecting the portions adapted to separate the insert from the recess walls being provided to permit the adaptor to conform to a variety of insert configurations. The portions of the adaptor which separate the surfaces of the insert from the walls of the recess have a thickness which is equal to the amount of material removed from the surfaces of the insert in one or more re-sharpening operations.

The present invention differs substantially from U.S. Pat. No. 4,722,642 in that it is not directed to an extremely thin insert adaptor designed for the extremely small size difference produced by a re-sharpening operation. Notably, re-sharpening of turning inserts is no longer common, or is perhaps even obsolete, in the modern high precision machining industry. The present invention relates to high precision industrial components and not to what could be called a basic bendable metal spacer of the type disclosed in U.S. Pat. No. 4,722,642.

U.S. Pat. No. 4,600,341 discloses an insert adaptor for a standard (A.N.S.I.) insert holder. The insert adaptor is configured to allow a standard insert pocket to accommodate a smaller insert of a similar or different shape. U.S. Pat. No. 4,600,341 further discloses a specialized clamping assembly for the different sized inserts.

The present invention relates to an improved insert adaptor initially developed for a similar purpose to that described in U.S. Pat. No. 4,600,341, namely, to allow smaller inserts to be secured to a standard insert pocket of a standard insert holder (A.N.S.I., ISO etc.). It will become clear, however that some of the advantageous design features are independently advantageous of this initially design purpose.

SUMMARY OF THE INVENTION

Smaller, and hence cheaper, inserts (which are typically made of materials far more expensive than steel, for example cemented carbide) are naturally purchased where they are believed that they can accomplish a desired machining application. Typically, an appropriately sized insert holder (i.e. with an appropriately sized insert pocket) for a selected optimal insert is purchased for a variety of reasons.

A first reason is that in modern mass-production manufacturing, international metal machining competition is fierce, particularly for standardized inserts and standardized tools which can be produced by all manufacturers. It is axiomatic that an insert holder optimized for a particular insert is expected to perform better than an insert holder designed for multi-use.

A second reason is that additional components such as insert adaptors are a significant additional cost.

A third reason is that machining is typically carried out in a space-limited environment, meaning that many turrets are unable to accommodate insert holders larger than a particular size.

A fourth reason is that increasing the number of components of a tool, decreases the user-friendliness of the tool, since there is a greater likelihood that the small components will fall during assembly or disassembly (known in the field as "falling-parts").

Finally, as a general rule, additional components typically reduce rigidity of the insert being secured to the insert holder, which causes a reduction in machining stability and hence reduces the finish quality of a machined piece.

Recently, the technology of additive manufacturing has advanced significantly, allowing practical manufacturing of components which were, until this time, difficult or expensive to manufacture.

While the cost of additive manufactured components is still unable to reach the precision of standard subtractive processes, and is relatively expensive, such expense is lessened when the components are extremely small.

It was theorized that insert adaptors for allowing standard turning tools to accommodate smaller inserts (which are more economically efficient, where suitable for a given machining application) could now be manufactured at a cost that would offset the standard product selection of simply purchasing an additional insert holder for the appropriately sized insert.

Nonetheless, the above-mentioned problem of "falling parts" still needed to be overcome and it was decided to magnetize the insert adaptor to ensure the component remains in the pocket even when the insert is not secured thereto. This also overcame the problem of modifying the already existing insert holder.

While the use of magnets is known for holding components together, it is not hitherto known for use adjacent a cutting insert typically used for machining metal workpieces since there is a concern that the metallic chips may become magnetically attached to the magnetized insert or tool, causing inconvenience or even damage if the chips are wedged between components.

Accordingly, according to a first aspect of the present invention, there is provided an insert adaptor for an insert pocket comprising: opposite adaptor top and bottom surfaces; an adaptor peripheral surface in turn comprising opposing insert abutment and pocket abutment surfaces, the adaptor peripheral surface connecting the top and bottom surfaces; and an imaginary median plane bisecting the top and bottom surfaces; wherein: one of the insert abutment surface, pocket abutment surface and adaptor bottom surface, comprises a first magnetic surface configured to apply a magnetic attraction force.

It should be understood that the use of the word "first", as for example in the paragraph above which recites a "first magnetic surface" does not require that there must also be a "second magnetic surface" unless one is explicitly introduced. Such language being used for convenience to subsequently differentiate elements (for example in dependent claims).

Preferably, the insert abutment surface comprises at least one abutment sub-surface projection. This can allow a high level of insert stability typically required by modern machining requirements. Even more preferably, for the same reason, the insert adaptor comprises a first leg, and, in a top view of the insert adaptor, the first leg is straight; and, said at least one abutment sub-surface projection are at least two abutment sub-surface projections which are spaced-apart by an abutment-relief recess.

Preferably the insert adaptor, comprising the first leg mentioned above, can comprise a second leg and, in a top view of the insert adaptor, the second leg is straight and non-parallel with the first leg; and, said second leg comprises at least two abutment sub-surface projections which are spaced-apart by an abutment-relief recess. Notably, this results in an insert contacting the insert adaptor at four different locations (i.e. the two abutment sub-surface projections on the first leg, and the two abutment sub-surface projections on the second leg). This design was intended to allow the insert adaptor to be indexable for right or left insert adaptors. However, it also resulted in a universally undesired phenomena of four intended contact points instead of the traditional three contact points (also called "over-constraint"). During testing it was found that the rigid precision insert indeed could contact the four points since the relatively small insert adaptor which was elastic although not plastically deformable like the bendable insert adaptor in U.S. Pat. No. 4,722,642, which seemingly allowed the additional contact. This contact may also, in theory, be assisted by the clamping method of the insert being via a top clamp or lever which pulls the insert into the insert adaptor.

In a plan view of the adaptor's top surface, said first and second straight legs can be joined at a corner of the insert adaptor. The corner can be configured for a desired insert, for example the corner can be a right-angle corner.

Preferably, the at least one abutment sub-surface projection extends on both sides of the medium plane. This can allow the insert adaptor to be indexable and consequently suitable in some cases for right or left insert holders.

Preferably, the first magnetic surface is configured to provide said magnetic attraction force by being formed with a first magnet recess, the insert adaptor further comprising a first magnet occupying the recess.

It will be understood that the first magnetic surface could be achieved in other ways, such as magnetizing the insert adaptor itself, affixing an external magnet to the desired portion of the insert adapter etc. The above-mentioned recess feature being preferred since the magnet being encased (by the insert adaptor and surface contacted by the first magnetic surface, e.g. the shim or insert pocket surface) assists to prevent chips being attracted to the first magnetic surface.

For similar reasons, it is preferred the first magnet is entirely embedded within the insert adaptor such that an outermost surface thereof is either flush with the first magnetic surface or is receded inside the adaptor therefrom. It will be understood that if the magnet protrudes from the insert holder it may hinder proper abutment of the insert adaptor or create a space where a chip could be lodged.

Preferably, the magnet is rigidly secured in the magnet recess.

Preferably, the magnet has a basic cylindrical shape.

Preferably, the insert adaptor further comprises a second magnet recess and a second magnet occupying the second magnet recess. It will be understood that a single magnet can be of sufficient magnetic strength to hold an insert adaptor to a desired adjacent shim or insert pocket, but to keep sufficient space for other functional parts of the insert adaptor (abutment surfaces etc., noting that magnets are generally brittle) and for purposes of suitable orientation, it is believed that two spaced-apart magnets are preferred over a single magnet.

Moreover, it should be pointed out that the prior art insert adaptors had no magnetic surface whatsoever because the insert clamping mechanism was used to simultaneously hold the insert adaptor to the insert holder. And while an extremely small magnet is sufficient to hold an insert holder to an insert pocket, the use of multiple magnets further allows sufficient strength for the insert adaptor to even be held to an insert pocket when the insert has been removed and while pressurized air is used to clean the insert pocket. At the present time, an insert adaptor configured to be held in a standard insert pocket (i.e. without being modified for mechanical securement, for example comprising a screw hole for the insert adaptor) even during said pressurized air application is not known.

For similar reasons, it is preferred for an insert adaptor to comprise a first leg, and, in a top view of the insert adaptor, the first leg is straight; and, both the first and second magnet recesses can be located in the first leg. In other words, this provides additional strength, for example, during said pressurized air application.

Preferably a first magnet recess can be located closer to the bottom surface than the top surface. This can keep brittle magnets out of an area where relatively high forces are compressing the insert adaptor against an insert pocket and/or can assist in allowing a thinner/more compact insert adaptor by spacing the magnets from an abutment portion of an insert adaptor.

Preferably, a different one of the insert abutment surface, pocket abutment surface and adaptor bottom surface to the surface which comprises the first magnetic surface, comprises a second magnetic surface configured to apply a magnetic attraction force. For example, the first magnetic surface can be for holding the insert adaptor to an insert pocket and the second magnetic surface can be for holding the insert adaptor to a shim. One preferred option is that the adaptor bottom surface comprises the second magnetic surface for holding the insert adaptor to either the pocket base surface or a shim.

The second magnetic surface can be configured to provide said magnetic attraction force by being formed with a magnet recess, the insert adaptor further comprising a magnet occupying the recess.

The insert adaptor can preferably be made of metal. While other materials can be used, the metal can assist in ensuring magnetic forces do not reach metal chips near the insert pocket.

The insert adaptor can preferably be configured to be elastically but not plastically deformable. Notably, the prior art insert in U.S. Pat. No. 4,722,642 is plastically deformable. However, for precision manufacturing a rigid, predetermined shape is preferred. Nonetheless, it will be understood that such thin components are to some extent elastically deformable.

According to another aspect, a tool can comprise an insert, an insert holder and an insert adaptor. The insert adaptor can have any of the features described above.

More precisely, the tool can comprise: an insert holder comprising a shank portion and a cutting portion extending therefrom; the cutting portion is formed with an insert pocket; the insert pocket is provided with a pocket base surface and at least one pocket support surface extending from the pocket base surface; and the tool further comprising an insert adaptor according to claim 1 and an insert seated in the insert pocket; wherein the insert abuts the insert abutment surface of the insert adaptor, and the pocket abutment surface of the insert adaptor abuts the insert pocket.

One preferred embodiment is that the pocket abutment surface comprises the first magnetic surface, and the insert adaptor is thereby configured to be self-secured to insert pocket.

Notably, the main conceived use, as shown in the drawings, is for the insert adaptor to be secured to the pocket support surfaces. Hence the first magnetic surface is preferably configured to be secured to the insert pocket's pocket support surface or, more preferably, more than one pocket surface. However, the same benefits may be considered for what is traditionally called a "shim". I.e. a component inserted between an insert and a pocket base surface. For the purposes of the specification and claims an "insert adaptor" can also refer to a traditionally called "shim", i.e. which interposes an insert and a pocket base surface, unless defined with additional features (e.g. the claimed insert adaptor being located between a "shim" and a "pocket abutment surface"). It will be understood, however, that according to any combination of features or embodiments claimed, the invention can be defined to exclude a shim function. For example, the insert adaptor can be further defined as a so-called lateral-insert adaptor which is a lateral-insert adaptor configured to be located only between the insert and the at least one pocket support surface. In other words, no portion of the lateral-insert adaptor is configured to be located, or located, between the insert and the pocket base surface. Alternatively, the invention can be defined to explicitly include a shim function by defining it as a shim-insert adaptor configured to be located at least between an insert and a pocket base surface.

Further, another way that the insert adaptor can be further defined as a so-called lateral-insert adaptor by having an elongated shape in which height dimension measured perpendicular to a medium plane is greater than a width dimension measured perpendicular to the height dimension and along the length direction of the lateral-insert adaptor. Such dimensions being the average dimensions in the directions defined.

The first magnetic surface can be the pocket abutment surface, thereby configuring the insert adapter to be self-secured to insert pocket.

According to some embodiments a tool can further comprise a shim located between the insert and the pocket base surface.

The first magnetic surface can be the insert abutment surface adjacent a shim, thereby configuring the insert adapter to be self-secured to the shim.

The first magnetic surface can be the adaptor bottom surface thereby configuring the insert adapter to be secured to either the insert pocket or a shim. It will be understood that if said adaptor bottom surface is adjacent the pocket it will be secured to the pocket, and if a shim interposes the adaptor bottom surface and the pocket, the first magnetic surface will be secured to the shim.

According to some embodiments the tool comprises a lever extending through the pocket base surface to hold the insert to the insert pocket. While a completely different lever is needed to that used when there is no insert adaptor in the pocket, an advantage of such system can be better chip flow than use of a top clamp as shown in U.S. Pat. No. 4,600,341. Additionally, such lever is preferred over a complex construction top clamp designed for different positions, as per the preferred embodiment of U.S. Pat. No. 4,600,341. It will be pointed out that while a traditional simple screw can also clamp an insert without impeding chip flow, to use an insert adaptor in a standard pocket would mean that a new screw hole would be required (at a different position) for the smaller insert (assuming the insert's hole is centrally located).

According to some embodiments the tool further comprises a shim in addition to the insert adaptor, the shim being located between the insert and the pocket base surface. Preferably, the insert adaptor is made of metal and the shim is made of cemented carbide. This allows the insert adaptor to be able to contain the magnetic forces as explained above, and the shim can be made of a preferred material for protecting the tool from machining damage. Preferably the metal is steel.

BRIEF DESCRIPTION OF THE DRAWINGS

For a better understanding of the subject matter of the present application and to show how the same may be carried out in practice, reference will now be made to the accompanying drawings, in which:

FIG. 39 is an isometric view of the insert adaptor of FIG. 37;

FIG. 40 is an isometric exploded view of the insert adaptor of FIG. 37 showing;

FIG. 41 is a top view of the insert adaptor of FIG. 37 showing hidden lines;

FIG. 42 is a cross-sectional view taken along lines XLII-XLII of FIG. 41;

FIG. 43 is a cross-sectional view taken along lines XLIII-XLIII of FIG. 41;

FIG. 44 is a rear view of insert adaptor of FIG. 28 showing an adaptor outer surface;

FIG. 45 is a front view of insert adaptor of FIG. 37 showing an adaptor inner surface;

Figure 1:
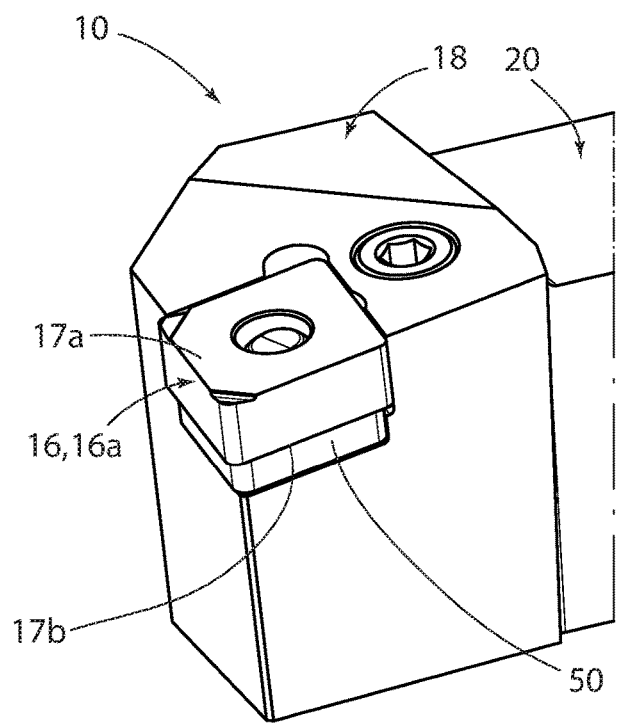
FIG. 1 is an isometric view of a standard turning tool with an insert holder, a standard insert with standard negative abutment geometry, shim, screw and standard lever.

Reference numerals may be repeated among the figures to indicate corresponding or analogous elements.

DETAILED DESCRIPTION OF THE INVENTION

Figure 2:
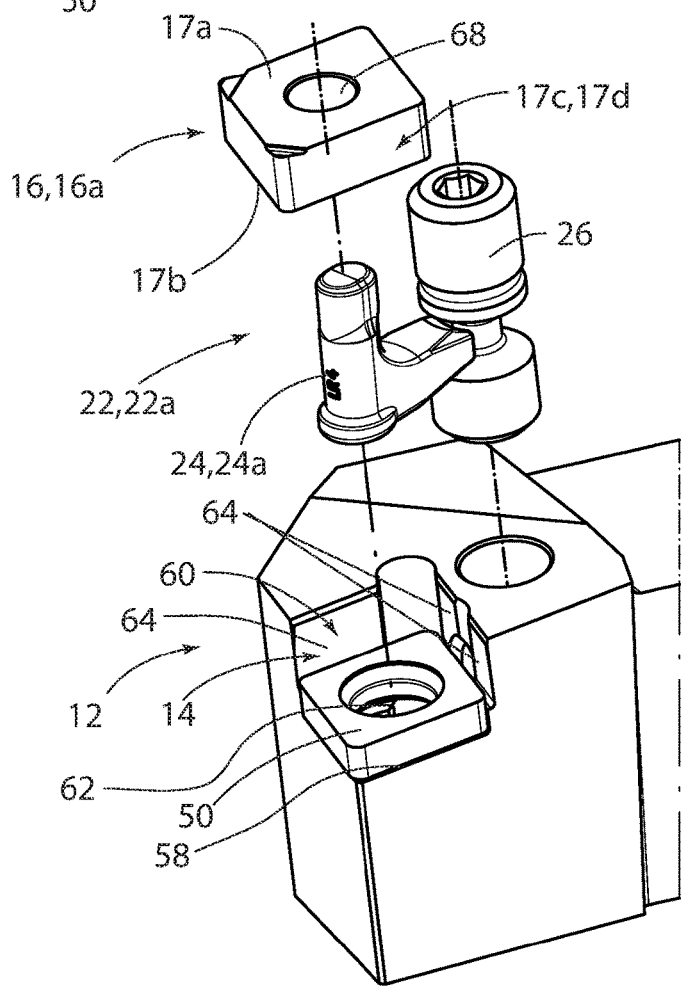
FIG. 2 is an isometric exploded view of the tool of FIG. 1.

Attention is drawn to FIGS. 1 and 2. A turning tool 10 includes an insert holder 12 with a pocket 14 configured for securing a single insert 16 of a specific geometry and size. The insert 16 shown is a standard insert 16a (i.e. the size of the standard insert 16a matches the pocket 14 size) and comprises insert top and bottom surfaces 17a, 17b and an insert peripheral surface 17c which extends therebetween. The insert peripheral surface 17c includes four lateral abutment surfaces 17d.

The present application refers in general to inserts generally designated "16". To help with understanding, an insert sized for a particular insert holder 12, is called a "standard insert" and is designated "16a". Alternatively, a smaller insert (described below) to be used with an insert adaptor 32 of the present invention is called a "specialized insert" and is designated "16b". It should be understood that both the standard and specialized inserts could be generally called by the name and designation "insert 16" and that this method of suffixing (without any suffix being a general name; suffixed with an "a" referring to a component as per the prior art; suffixed with a "b" referring to a specialized component of the present invention) is merely for convenience and is also true for some, but not all, components described below such as the levers, top clamps and shims, but not all components as is clear from context.

The word 'standard' is used herein to indicate that the geometry of inserts, pockets or abutment geometry, are designed according to recognized standards such as ISO or ANSI standards.

Alternatively, the word "specialized" is used herein to indicate a modified component, i.e. different to the standard component.

The insert holder 12 has a cutting portion 18 extending from a shank portion 20. The shank portion 20 is configured to fit into, and be secured by, a Computer Numerical Control (CNC) machine.

The insert holder 12, more precisely the cutting portion 18, comprises said insert pocket 14, a standard clamping mechanism 22, 22a and the standard insert 16a is secured in the pocket 14 via the standard clamping mechanism 22, 22a.

The standard clamping mechanism 22, according to this exemplary embodiment, comprises a clamping member 23 which in this case is a standard lever 24, 24a and a corresponding lever screw 26 (see FIGS. 1-2) which is threadingly secured to the insert holder's cutting portion 18. According to other embodiments of the present invention, the standard clamping mechanism 22 can alternatively comprise a clamping member 23 which is a specialized top clamp 28b (FIG. 6), with a corresponding clamp screw.

Figure 3:
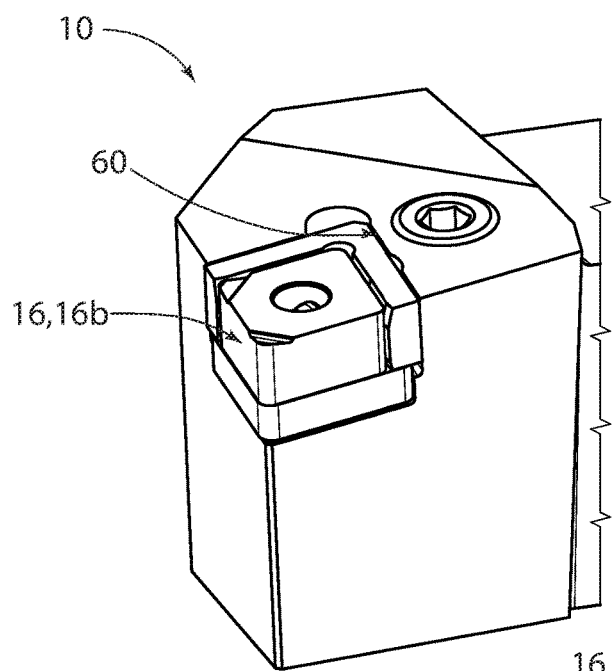
FIG. 3 is an isometric view of a tool comprising the same insert holder and screw as the tool of FIG. 1, and a specialized insert and specialized lever, the tool further includes an insert adaptor with a single bend (i.e. having two straight legs)
Figure 4:
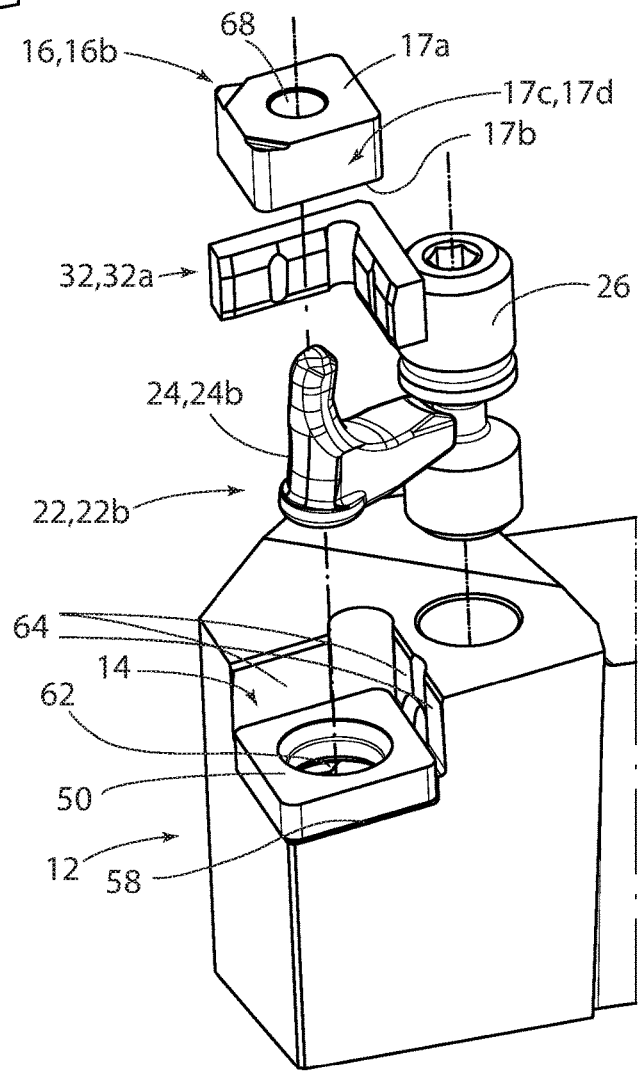
FIG. 4 is an isometric exploded view of the tool of FIG. 3.

Attention is drawn to FIGS. 3-4. The tool 10 can further include an insert adaptor 32 configured to enable securement of different inserts in the same insert pocket 14 as will be further disclosed below.

The standard clamping mechanisms 22, such as that shown in FIG. 2, are configured to secure a standard insert 16a of a first geometry and size. In various scenarios, an operator may replace the standard insert 16a with a specialized insert 16b of a smaller size and in some cases different geometry (in this example the geometry is the same). Consequently, the above-described standard clamping mechanism 22a is no longer suitable for securing the specialized insert 16b in the same insert pocket 14.

According to some embodiments, the standard insert 16a is a negative insert, which has negative lateral abutment surfaces 17d. In the present context, the term negative insert means that the lateral abutment surfaces 17d are perpendicular to both the insert top and bottom surfaces 17a, 17b.

It will be understood that while the specialized insert 16b, can be identical to the standard insert 16a except for being a smaller size, the insert adaptor 32 could be configured to abut a smaller insert of the same geometry as the standard insert 16a or a smaller insert with a different geometry (not shown). More precisely, the insert adaptor 32 comprises what will be called an insert abutment surface 38 (FIG. 9), which, as the name indicates, is configured to abut an insert, and the insert abutment surface 38 can be configured for a different insert geometry, if desired.

As exemplified in FIGS. 3 and 4, the specialized insert 16b shown is, like the larger standard insert 16a, the same geometry and hence also a negative insert with negative lateral abutment surfaces 17d such, e.g., as seen in FIGS. 1-6, 20-21, 28-29 and 37-38.

Figure 13:
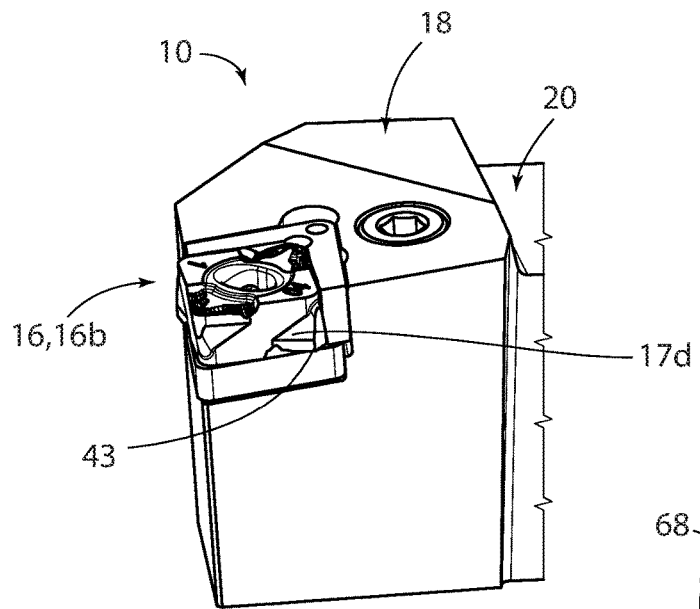
FIG. 13 is an isometric view of a turning tool having an insert holder, an insert adaptor with a single bend, a specialized lever and a specialized insert with positive cutting geometry and non-standard, positive relief, abutment geometry.
Figure 14:
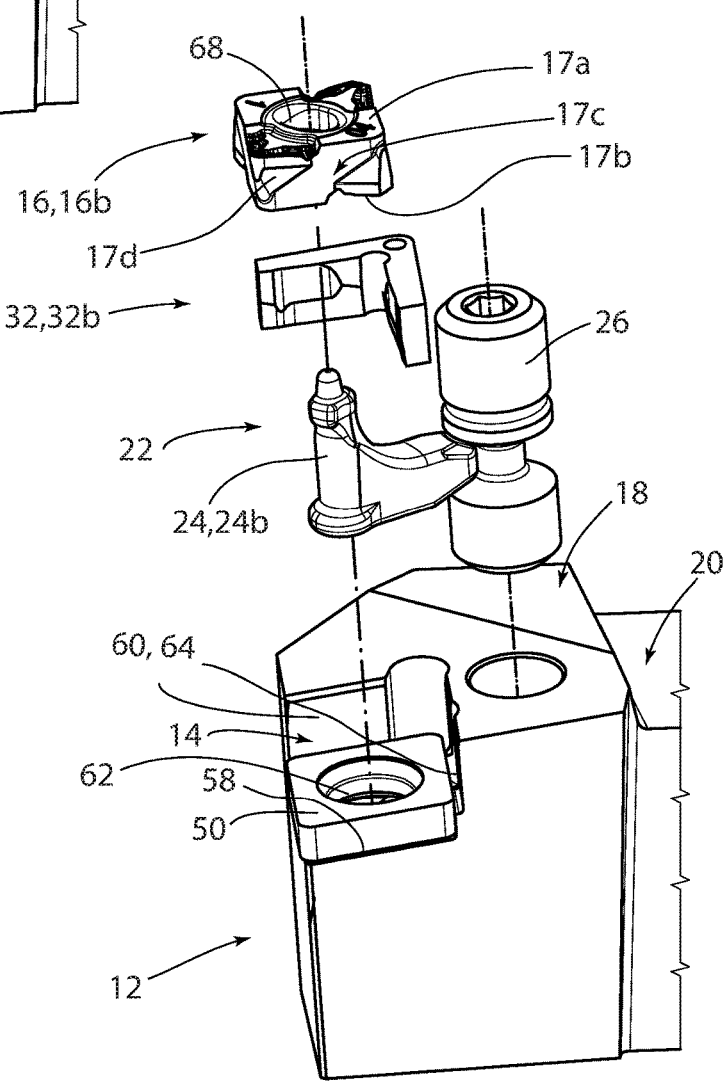
FIG. 14 is an isometric exploded view of the turning tool of FIG. 13.
Figure 15:
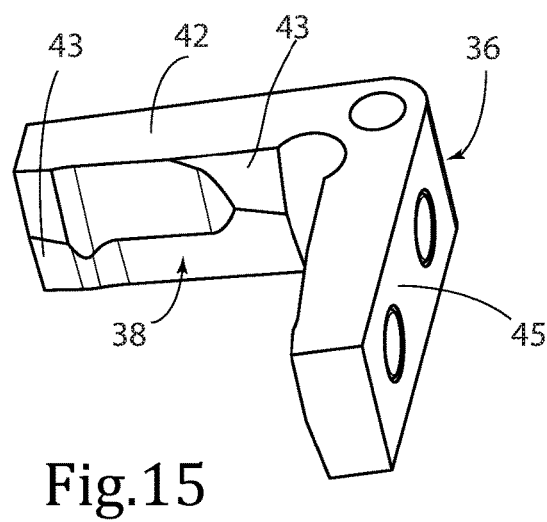
FIG. 15 is an isometric view of the insert adaptor of FIG. 13.
Figure 16:
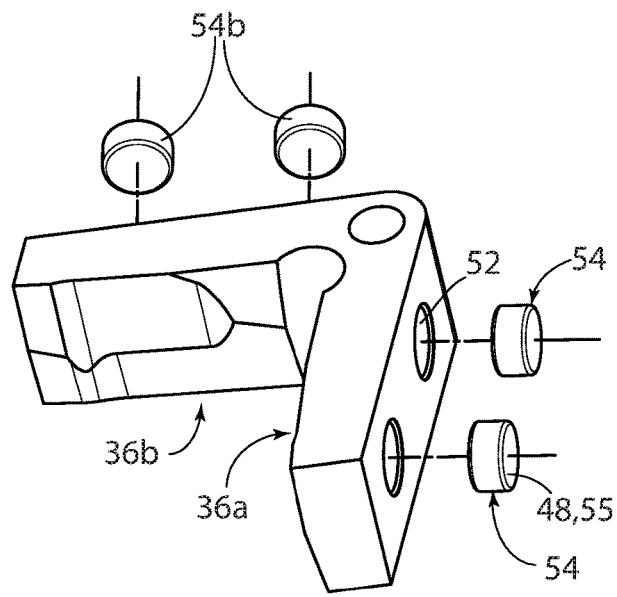
FIG. 16 is an isometric exploded view of the insert adaptor of FIG. 13.
Figure 17:
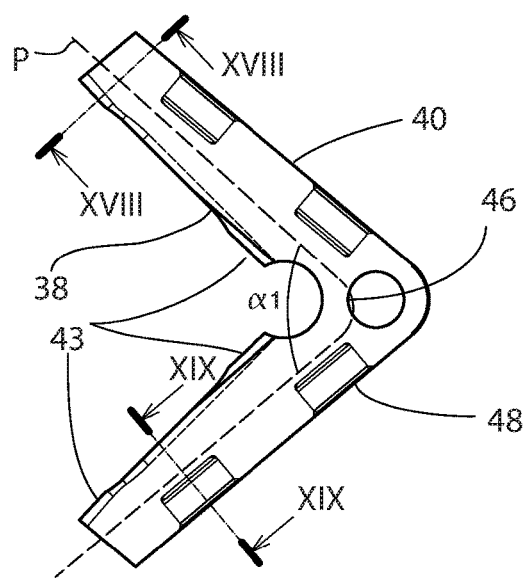
FIG. 17 is a top view of the insert adaptor of FIG. 13 showing hidden lines.
Figure 18:
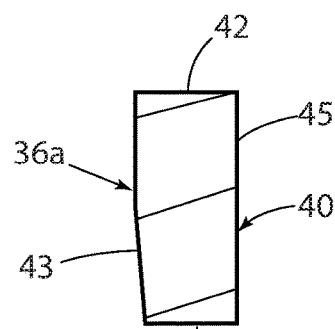
FIG. 18 is a cross-sectional view taken along lines XVIII-XVIII of FIG. 17.
Figure 19:
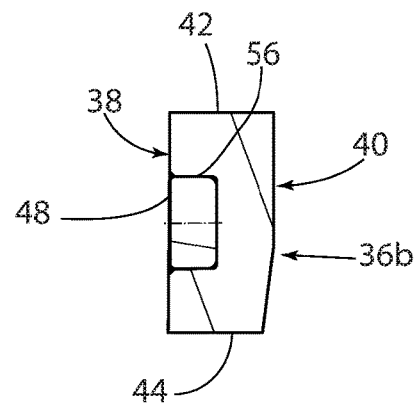
FIG. 19 is a cross-sectional view taken along lines XIX-XIX of FIG. 17.
Figures 20, 21:
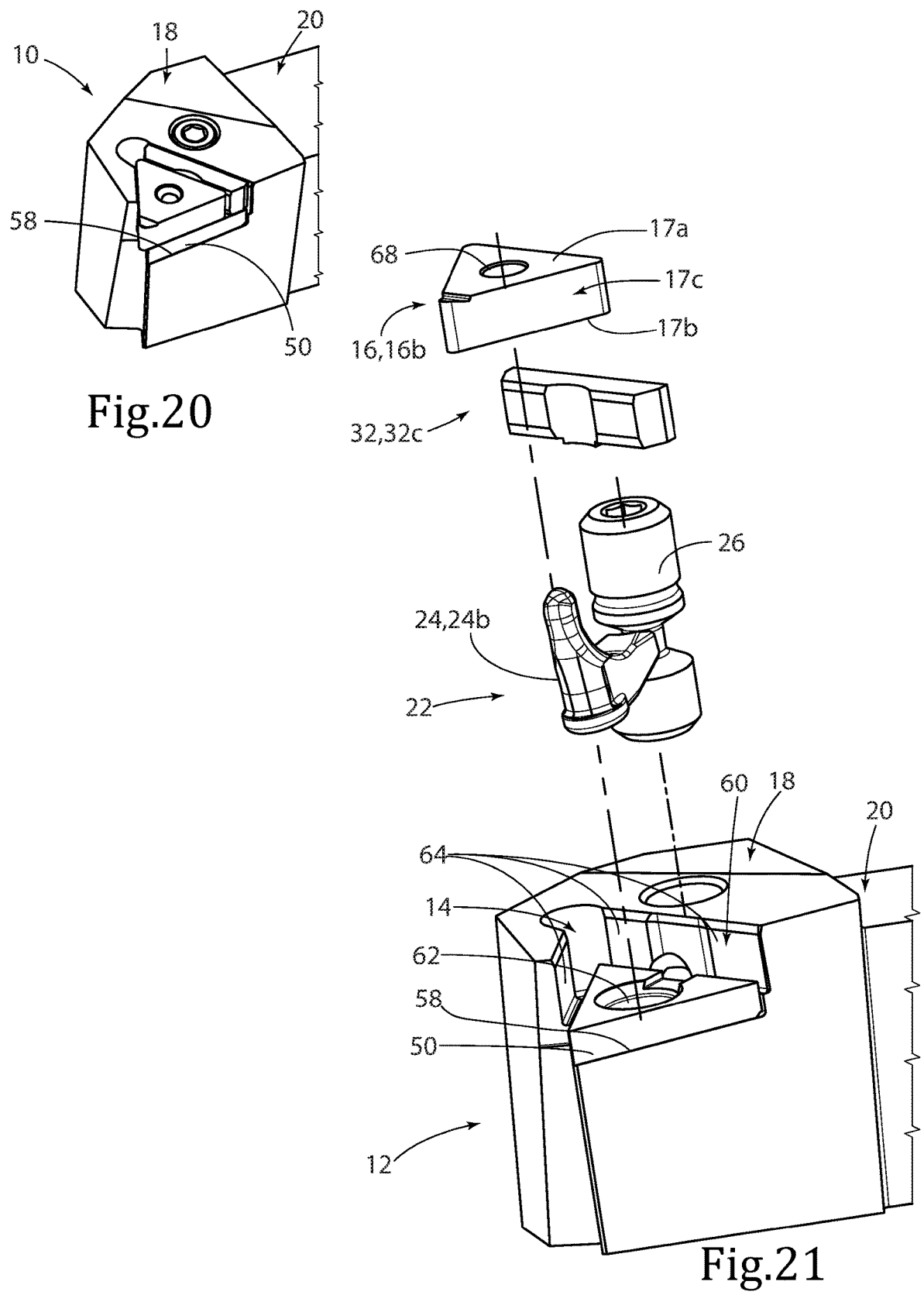
FIG. 20 is an isometric view of a turning tool having an insert holder, an insert adaptor with no bends, a specialized lever and a negative specialized insert with standard, negative abutment geometry.
FIG. 21 is an isometric exploded view of the turning tool of FIG. 20.
Figure 22:
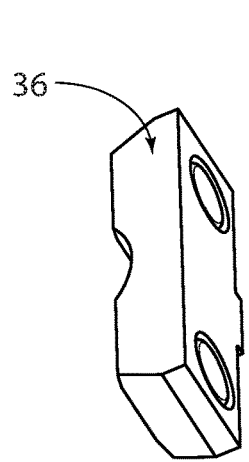
FIG. 22 is an isometric view of the insert adaptor of FIG. 20.
Figure 23:
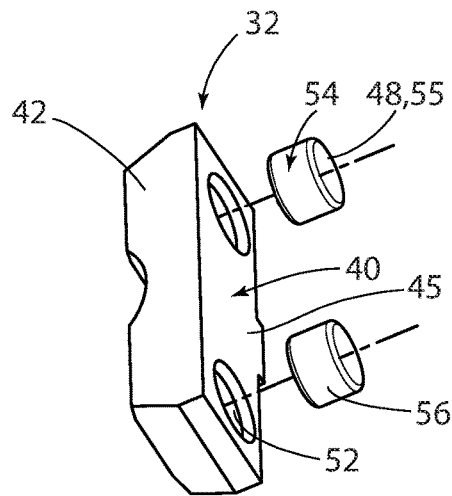
FIG. 23 is an isometric exploded view of the insert adaptor of FIG. 20.

Alternatively, as exemplified in FIGS. 13 and 14, a different specialized insert 16b intended for the same insert holder 12 shown in FIGS. 1 and 2, can have not only a smaller size but also a different abutment geometry, which in this case is a positive cutting and abutment geometry. Yet another example, i.e. the specialized insert 16b shown in FIGS. 46-47 has a negative cutting geometry but with a convex abutment protrusion which has outwardly tapering lateral abutment surfaces 17d. This abutment geometry is sometimes referred to as a 'dovetail' abutment geometry.

It will be understood that the insert adaptor 32, and more precisely the insert abutment surface 38 thereof, can be designed to conform to an abutment geometry as desired.

Referring to FIGS. 3 and 4, as mentioned above, since a different insert 16b is now being secured to the insert pocket 14, the standard clamping mechanism 22a is no longer suitable. It will be understood that the specialized inserts are smaller than the standard inserts, and a center of the insert's clamping bore 68 is located in a different location to the center of a standard insert's clamping bore and hence a different lever is required. Accordingly, the tool 10 is fitted with a specialized lever 24b.

Figure 5:
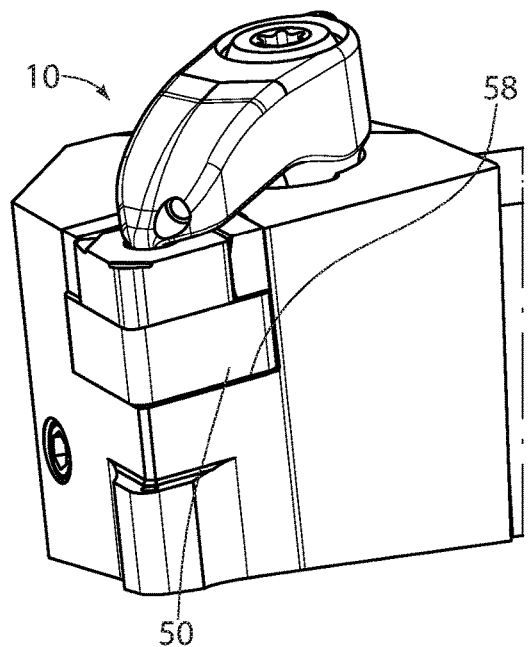
FIG. 5 is an isometric view of a turning tool having an insert holder, an insert adaptor with a single bend, a specialized top clamp and a negative specialized insert with standard negative abutment geometry.
Figure 6:
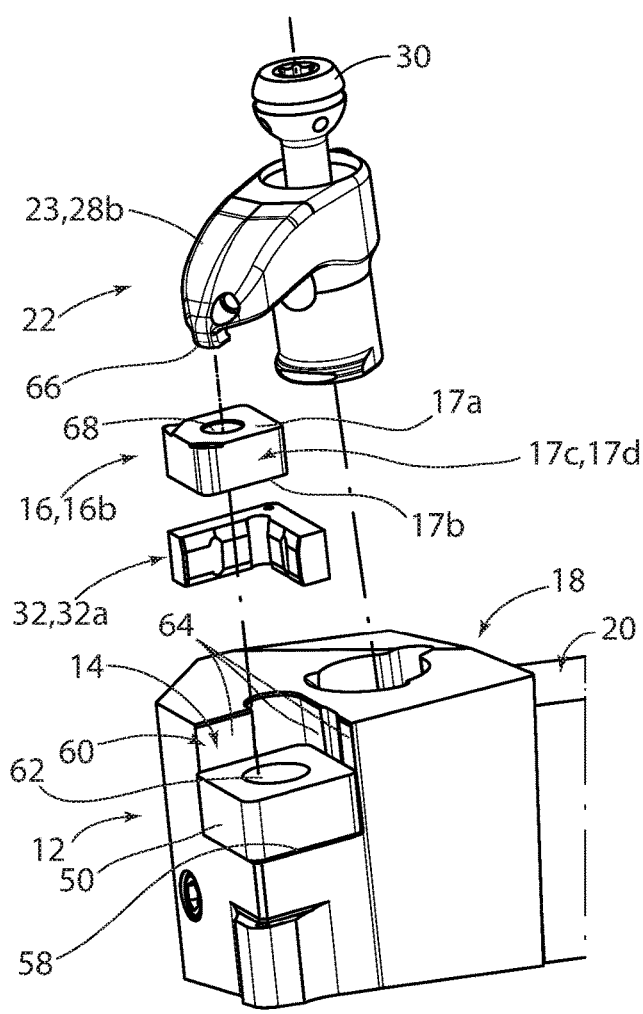
FIG. 6 is an isometric exploded view of the tool of FIG. 5.

Referring to FIGS. 5 and 6, the holder's cutting portion 18 could alternatively be of a type which uses a top clamp. Shown is a specialized top clamp 28b (FIGS. 5-6) sized for use with the insert adaptor 32.

Contrary to the previous suffix system, each insert adaptor 32 is suffixed with a different letter (i.e. all insert adaptors are not standard components).

Referring to FIGS. 4 to 12, the insert adaptor 32a, will be described with the basic features of all insert adaptors 32 according to the present invention, and optional differences will be indicated below with respect to different embodiments.

The insert adaptor 32a has a rigid body. Stated differently, the insert adaptor 32a is elastic, because it is made of metal, but is not plastically deformable. Stated differently, it is not designed to be bent into other shapes.

The insert adaptor 32a comprises opposite adaptor top and bottom surfaces 42, 44, which are connected by an adaptor peripheral surface 37.

Figure 56:
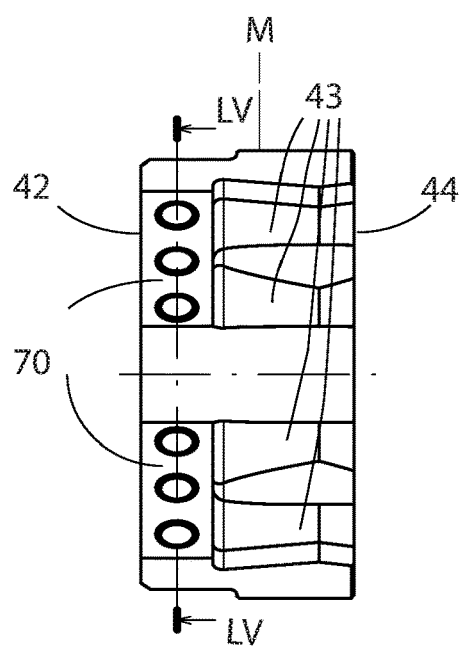
FIG. 56 is a front view of insert adaptor of FIG. 46 showing an adaptor inner surface and a shim abutment surface.

An imaginary median plane M (FIG. 12) bisects the top and bottom surfaces 42, 44. The insert adaptor 32a can be preferably symmetric on both sides of the median plane M, as exemplified here. In other embodiments, such as the embodiment exemplified in FIG. 56, there can be a preference for an insert adaptor not to be symmetric on both sides of a median plane, as explained hereinafter.

The adaptor peripheral surface 37 comprises an insert abutment surface 38, which is configured to abut an insert, and a pocket abutment surface 40, which is configured to abut an insert pocket 14.

The insert adaptor 32a is a lateral-insert adaptor having an elongated shape in which height dimension HD (FIG. 12) measured perpendicular to the medium plane is greater than a width dimension WD (FIG. 9) measured perpendicular to the height dimension and along the length direction of the lateral-insert adaptor.

Figure 7:
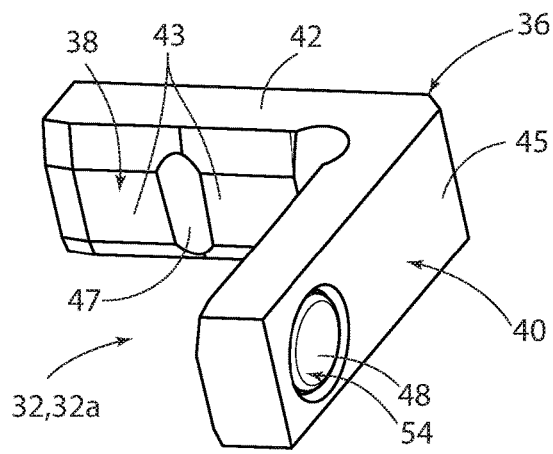
FIG. 7 is an isometric view of the insert adaptor of FIG. 5.
Figure 8:
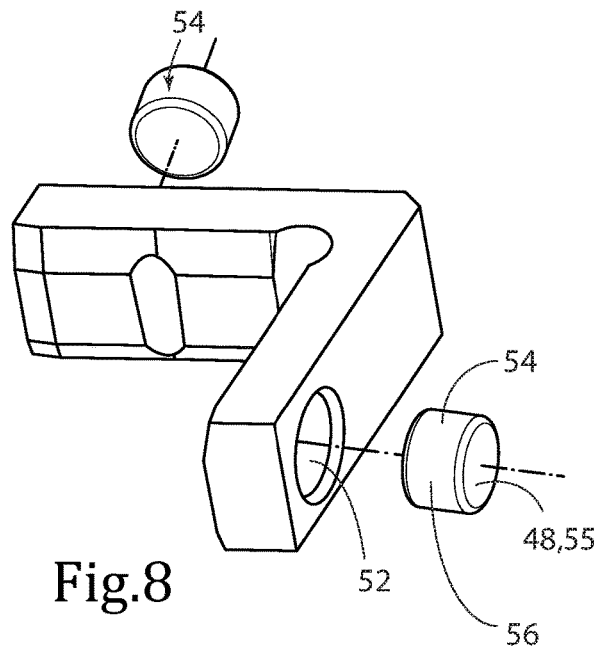
FIG. 8 is an isometric exploded view of the insert adaptor of FIG. 5.
Figure 10:
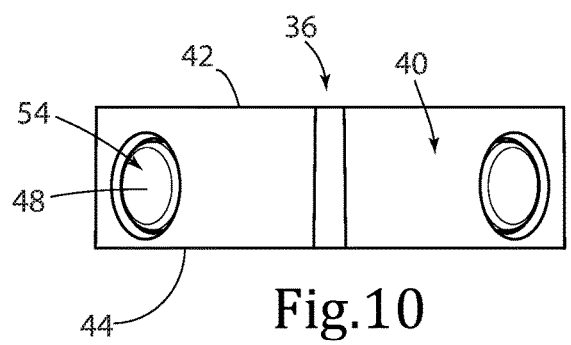
FIG. 10 is a rear view of insert adaptor of FIG. 5 showing a pocket abutment surface.

The insert abutment surface 38 can preferably comprise at least one abutment sub-surface projection 43 configured for engagement with the specialized insert 16b. More preferably, the insert abutment surface 38 can comprise two abutment sub-surface projections 43 which are spaced-apart by an abutment-relief recess 47 (FIG. 7).

In the example shown the insert adaptor 32a comprises two legs 36a, 36b, which both have the same features (i.e. two abutment sub-surface projections 43 which are spaced-apart by an abutment-relief recess 47).

The insert adaptor 32, or more precisely, an adaptor body 36 thereof, is preferably made of steel and has a unitary, one-piece construction. The adaptor body 36 is preferably produced by additive manufacturing.

The adaptor body 36 can have an imaginary median planar arrangement P (FIGS. 9, 17, 26, 35 and 41) which passes mid-way between the insert abutment surface 38 and pocket abutment surface 40. According to some embodiments, such as FIG. 24, in a top view, the median planar arrangement P extends in a straight line. According to other embodiments, such as the example shown in FIG. 9, the median surface P includes only a single bend 46. The bend 46 separates the median planar arrangement P into two straight portions (or straight legs) which form an acute adaptor angle a1 therebetween. According to further embodiments, such as that shown in FIG. 41, the median planar arrangement P includes more than one bend, particularly, two bends as shown.

The insert adaptor 32a has a first magnetic surface 48. In the example shown in FIG. 9, the pocket abutment surface 40 comprises the first magnetic surface 48.

The first magnetic surface 48 can be configured to provide a magnetic attraction force by being formed with a first magnet recess 52, and the insert adaptor 32 further comprising a first magnet 54 occupying the first magnet recess 52.

It will be understood that alternatively, the entire insert adaptor 32 or part thereof could be magnetized. In embodiments where an actual magnet is used, the insert adaptor 32 comprises both an adaptor body 36 and a magnet 54 secured to the adaptor body 36. In this and the other examples shown, said securement is via magnet recesses 52.

Where a first magnet 54 is used as shown, the magnetic attraction force direction, provided more precisely by the magnet's exposed surface (in this example the magnet end 55 as designated in FIG. 10), and can hence be controlled to the direction where the first magnet 54 is not encompassed by the adaptor body 36.

The first magnet 54 can have a magnet peripheral surface 56 which extends between magnet ends 55. Preferably the magnets 54 used can have a basically cylindrical shape. The first magnet 54 can be rigidly secured in the magnet recess 52 in the adaptor body 36, preferably via adhesive.

Figure 9:
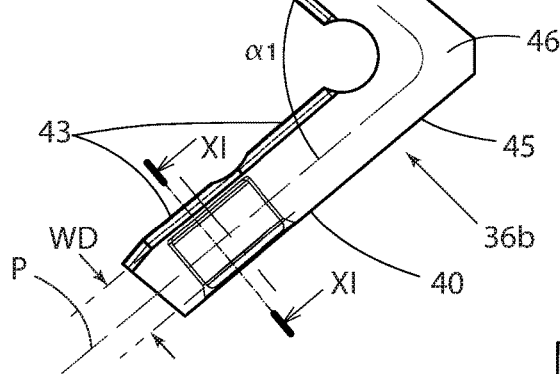
FIG. 9 is a top view of the insert adaptor of FIG. 5 showing hidden lines.
Figure 11:
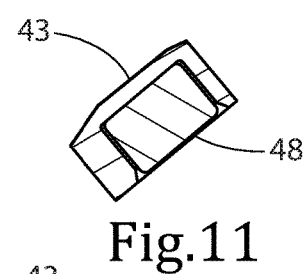
FIG. 11 is a cross-sectional view taken along lines XI-XI of FIG. 9.
Figure 12:
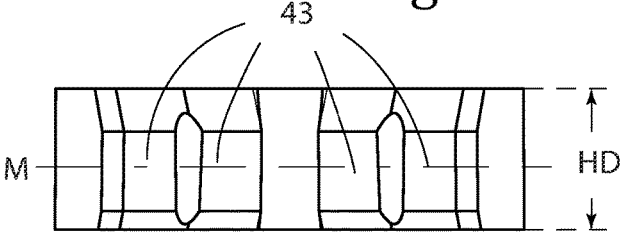
FIG. 12 is a front view of insert adaptor of FIG. 5 showing an insert abutment surface.

As shown, for example in FIGS. 9 and 11, the first magnet 54 is entirely embedded within the insert adaptor such that an outermost surface 55 thereof is basically flush with the first magnetic surface 48, or as understood better from FIG. 9, slightly receded inside the adaptor from the first magnetic surface 48. It will be understood that magnetic attraction forces are also applied to adjacent surfaces even without contact, as long as a separation distance is small.

According to some embodiments, the insert abutment surface 38 could comprise the first magnetic surface 48.

An alternative, as shown, for example in FIGS. 46 to 56, can be that the insert adaptor 32f can comprise two or more magnetic surfaces. Therefore, as shown, the pocket abutment surface 40 can comprises the first magnetic surface 48 (which can be one or more magnets 54 in recesses 52 as shown), and the insert abutment surface 38 can comprise a second magnetic surface 48s (which can be one or more magnets 54s in recesses 52 as shown).

In this example the second magnetic surface 48s is configured to secure the insert adaptor 32f to a specialized shim 50, 50b.

Reverting to FIG. 4, some general pocket 14 features are typically a pocket base surface 58, pocket support surfaces 60, a clamping hole 62 which opens out to the pocket base surface 58 and, in this example accommodates both a standard and specialized lever 24, 24a, 24b. The pocket support surfaces 60 extend away from the pocket base surface 58. Each pocket support surface 60 can have one or two distinct abutment regions 64 configured to abut the insert 16b or when the insert adaptor 32 is inserted in the pocket 14, then the insert adaptor 32. The abutment regions 64 are planar and typically are perpendicular, or substantially perpendicular (e.g. with tolerances up to one degree), to the pocket base surface 58.

When tightened, the lever screw 26 is configured to force the standard or specialized lever 24a, 24b to force and secure the respective standard or specialized insert 16a, 16b against the respective abutment regions 64 or the insert adaptor's insert abutment surface 38.

Attention is reverted to FIG. 5-6. Rather than a lever, a specialized top clamp 28b can comprise an abutment protrusion 66 configured to press against an insert clamping bore 68.

In many cases, a pocket 14 can include the shim 50, located under the turning insert 16, on the pocket base surface 58, separating the two. The shim 50 is normally intended to protect at least the pocket base surface 58 from wear caused by possible insert breakage, but also to protect the workpiece. In some cases, a specialized shim 50b can be configured to seat, or accommodate, a specialized insert 16b in the same pocket 14. The specialized shim 50b can also be configured to correspond to the insert adaptor 32.

The specialized shim 50b is normally made of cemented carbide, which is harder than steel, which can prevent the specialized shim 50b from melting and damaging the workpiece or the pocket 14 in case the insert breaks.

Reverting to FIGS. 3-12. According to the first embodiment, the insert adaptor 32a has exactly two adaptor support surfaces 45 and exactly four abutment sub-surface projections 43. The adaptor abutment sub-surface projections 43 and support surfaces 45 are parallel, or substantially parallel (with tolerances up to one degree). This geometry is suited to secure negative specialized inserts 16b in a negative pocket 14 originally configured to secure a negative standard insert 16a. The insert adaptor 32a has exactly two magnets 54. Each pocket attracting member 54 is located on an adaptor support surface 45. The median planar arrangement P has exactly a single bend 46, and so the adaptor 32a is considered to have two legs 36a, 36b. The adaptor angle a1 is preferably acute.

Attention is drawn to FIGS. 13-19. According to a second embodiment, the insert adaptor 32b again has two legs 36a, 36b, exactly two adaptor support surfaces 45 and four abutment sub-surface projections 43. The abutment sub-surface projections 43 and adaptor support surfaces 45 (FIG. 18) on a given leg (leg 36a in FIG. 18) are not parallel, and can converge towards the adaptor bottom surface 44 (as seen in the cross-section of FIG. 18). This geometry is suited to secure a specialized insert 16b which has tapered lateral abutment surfaces 17d in a negative pocket 14 suited to secure a negative standard insert 16a. The insert adaptor 32b has exactly four magnets (FIG. 16) i.e., two first magnets 54 on the first leg 36a and two second magnets 54b on the second leg 36b. The median planar arrangement P has only a single bend 46, located in the region where the two legs 36a, 36b join one another. The adaptor has an internal adaptor angle a1 measured on opposite sides of the bend 46; the adaptor angle a1 is acute.

Figure 24:
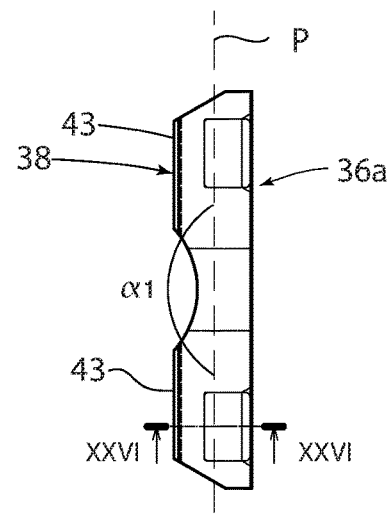
FIG. 24 is a top view of the insert adaptor of FIG. 20 showing hidden lines.
Figure 25:
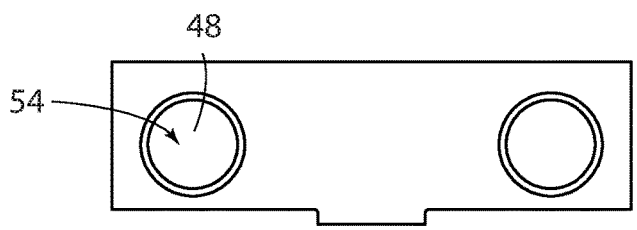
FIG. 25 is a rear view of insert adaptor of FIG. 20 showing an adaptor outer surface.
Figure 26:
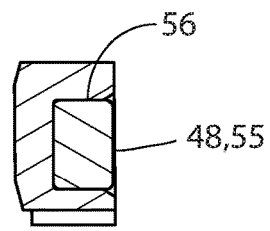
FIG. 26 is a cross-sectional view taken along lines XXVI-XXVI of FIG. 24.
Figure 27:
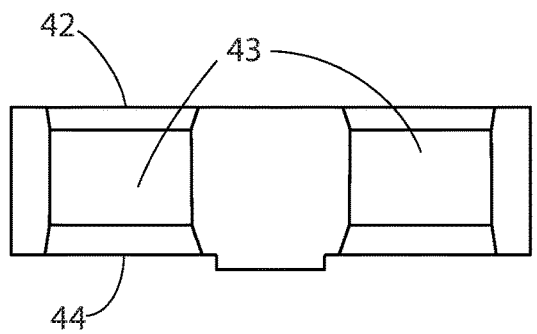
FIG. 27 is a front view of insert adaptor of FIG. 20 showing an adaptor inner surface.
Figure 28:
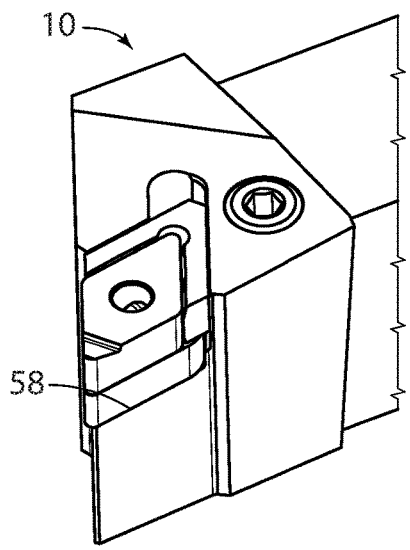
FIG. 28 is an isometric view of a turning tool having an insert holder, an insert adaptor with a single bend, a specialized lever and a negative specialized insert with standard, negative abutment geometry.
Figure 29:
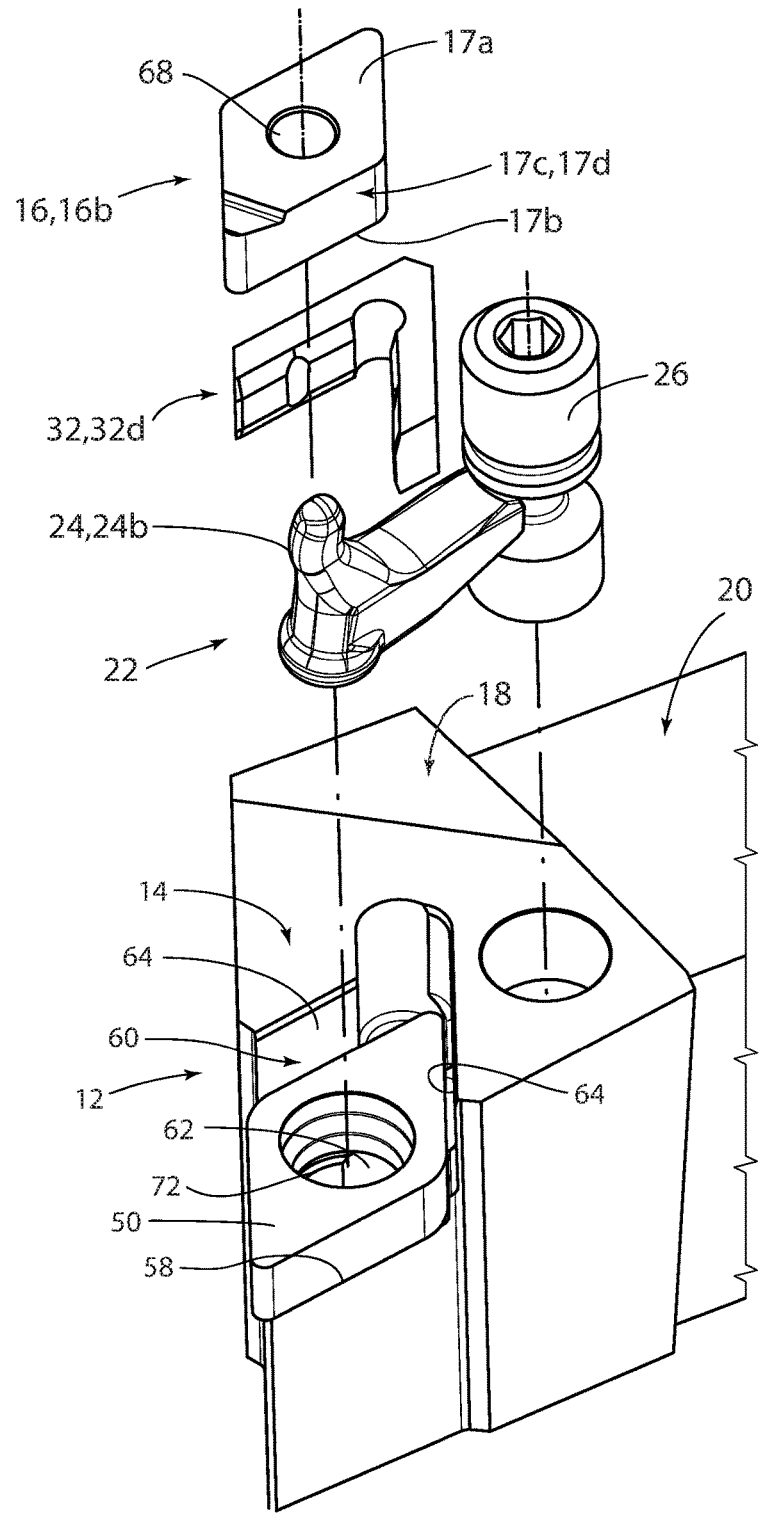
FIG. 29 is an isometric exploded view of the turning tool of FIG. 28.
Figure 30:
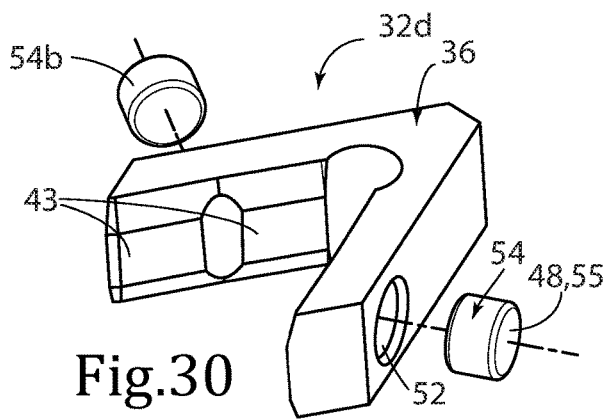
FIG. 30 is an isometric view of the insert adaptor of FIG. 28.
Figure 31:
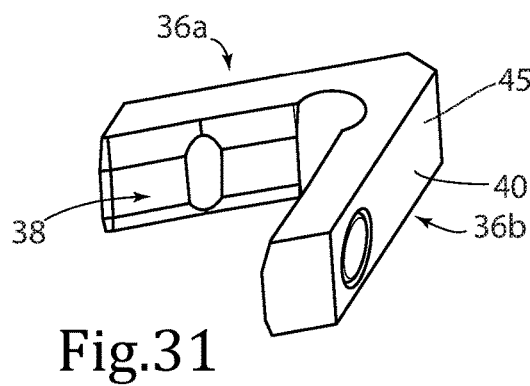
FIG. 31 is an isometric exploded view of the insert adaptor of FIG. 28.
Figure 32:
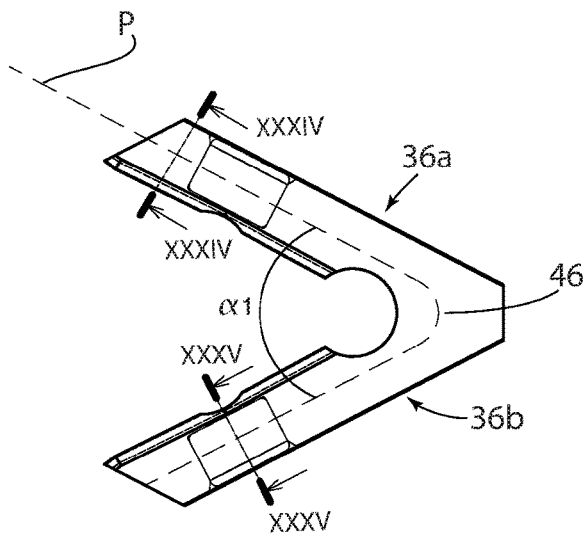
FIG. 32 is a top view of the insert adaptor of FIG. 28 showing hidden lines.
Figure 33:
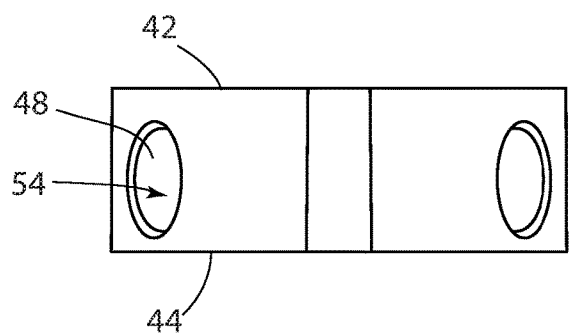
FIG. 33 is a rear view of insert adaptor of FIG. 28 showing an adaptor outer surface.
Figure 36:
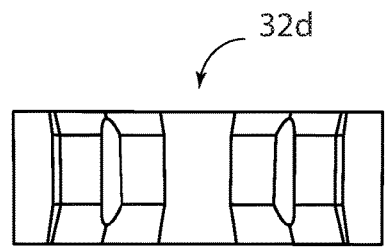
FIG. 36 is a front view of insert adaptor of FIG. 28 showing an adaptor inner surface.
Figures 34, 35:
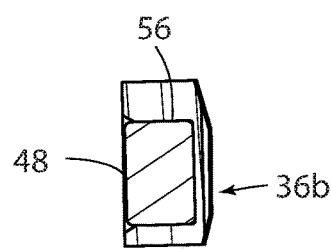
FIG. 34 is a cross-sectional view taken along lines XXXIV-XXXIV of FIG. 32.
FIG. 35 is a cross-sectional view taken along lines XXXV-XXXV of FIG. 32.
Figure 37:
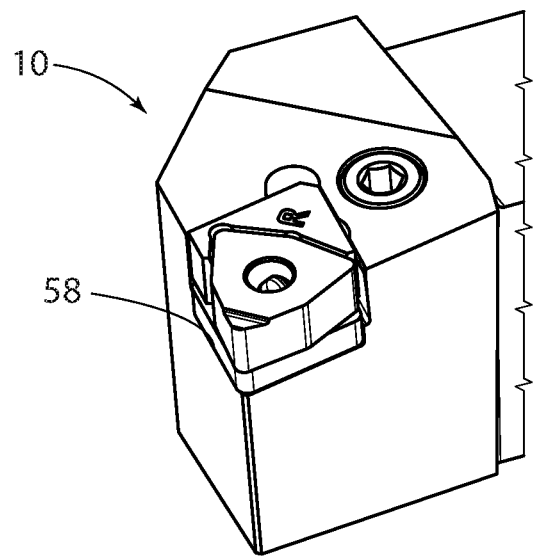
FIG. 37 is an isometric view of a turning tool having an insert holder, an insert adaptor with two bends, a specialized lever and a negative specialized insert with standard, negative abutment geometry.
Figure 38:
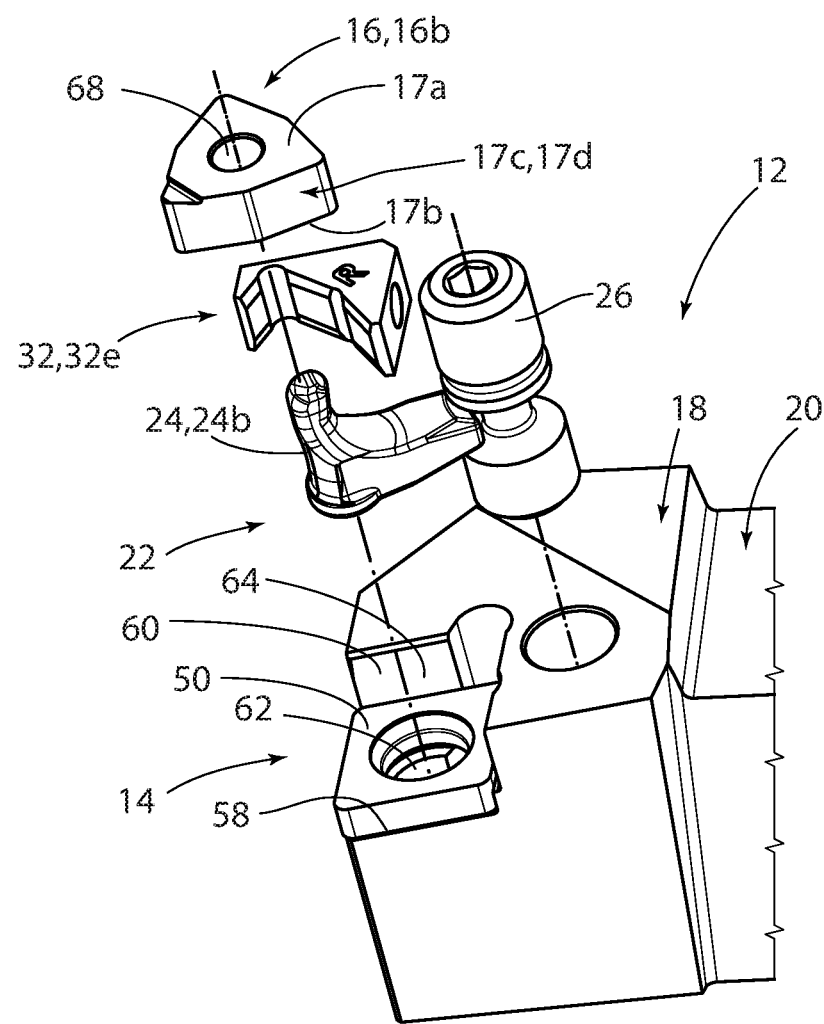
FIG. 38 is an isometric exploded view of the turning tool of FIG. 37.

Attention is drawn to FIGS. 20-27. According to a third embodiment, the insert adaptor 32c has only a single adaptor support surface 45 and exactly two abutment sub-surface projections 43. The abutment sub-surface projections 43 and adaptor support surfaces 45 are parallel, or substantially parallel (with tolerances up to one degree). This geometry is suited to secure negative specialized inserts 16b in a negative pocket 14 suited to secure a negative standard insert 16a. The median planar arrangement P has no bends, i.e., has a single straight leg, and the adaptor 32c appears straight, or substantially straight in a top view thereof (FIG. 24). The adaptor angle a1 equals 180 degrees. Furthermore, the pocket abutment surface 40 is planar.

Attention is drawn to FIGS. 28-36. According to a fourth embodiment, the insert adaptor 32d has two legs 36a, 36b, exactly two adaptor support surfaces 45 and four abutment sub-surface projections 43. The abutment sub-surface projections 43 and adaptor support surfaces 45 (FIG. 34) on a given leg (leg 36a shown in FIG. 34) are parallel, or substantially parallel (with tolerances up to one degree). This geometry is suited to secure negative specialized inserts 16b in a negative pocket 14 suited to secure a negative standard insert 16a. The insert adaptor 32d has exactly two magnets 54, 54b, i.e. only one on each leg 36a, 26b. The median planar arrangement P has exactly a single bend 46. The adaptor angle a1 is acute, and preferably equals less than 65 degrees.

Attention is drawn to FIGS. 37-45. According to a fifth embodiment, the insert adaptor 32e has three legs 36a, 36b, 36c, exactly two adaptor support surfaces 45 and exactly three abutment sub-surface projections 43. The first leg 36a is in-between the second leg 36b and the third leg 36c. The first leg 36a forms a first angle with the second leg 36b and forms a second angle with the third leg 36c. The third leg 36c is shorter than at least the first leg 36a. The abutment sub-surface projections 43 and adaptor support surfaces 45 (FIG. 43) on a given leg 36a, 36b form an angle with one another. This geometry is suited to secure e.g., trigonal negative specialized inserts 16b (seen in FIGS. 37-38) in a negative pocket 14 suited to secure a negative standard insert 16a. The median planar arrangement P has exactly two bends 46. A first adaptor angle a1 is obtuse, and a second adaptor angle a2 is also obtuse (FIG. 41).

Attention is drawn to FIGS. 46-56. According to a sixth embodiment, the insert adaptor 32f has an upper body portion 36d adjacent to and comprising the adaptor top surface 42 and a lower body portion 36e adjacent to and comprising the adaptor bottom surface 44. The adaptor 32f has two legs, 36a, 36b, exactly two adaptor support surfaces 45 (one on each leg) and exactly four abutment sub-surface projections 43, two on each leg). The abutment sub-surface projections 43 and adaptor support surfaces 45 are not parallel, and can converge towards the adaptor bottom surface 44. This geometry is suited to secure a specialized insert 16b which has lateral abutment surfaces 17d which converge outwardly. The sixth embodiment of the adaptor 32e, is configured to be seated in a negative pocket 14 suited to secure a negative standard insert 16a. On its lower portion 36e adaptor inner surface 38 has two shim abutment surfaces 70 which are configured to abut the specialized shim 50b.

According to the sixth embodiment, the adaptor further has six magnets 54s located at the insert abutment surface 38, on the adaptor's lower body portion 36e. The magnets 54s are configured to hold/attract the shim 50b, in cases wherein the shim 50b is not coupled into the pocket via other means.

Attention is drawn to FIGS. 3, 5, 13, 20, 28 and 37. In a clamped, or operative position of the insert adaptor 32 and the specialized insert 16b, the specialized top clamp 28b or specialized lever 24b abuts the insert clamping bore 68 of the specialized insert 16b and forces it against the shim 50 which, in turn, abuts the pocket base surface 58. The specialized insert 16b is also forced against the insert adaptor 32. Specifically, the lateral abutment surfaces 17d abut the respective abutment sub-surface projections 43. In turn, the adaptor support surfaces 45 abut the respective abutment regions 64 located on the pocket support surfaces 60 of the pocket 14.

Figure 46:
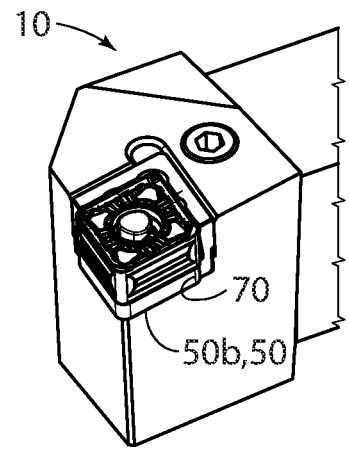
FIG. 46 is an isometric view of a turning tool having an insert holder, an insert adaptor with a single bend, a specialized lever and a negative specialized insert with non-standard, outwardly tapering, abutment geometry.
Figure 47:
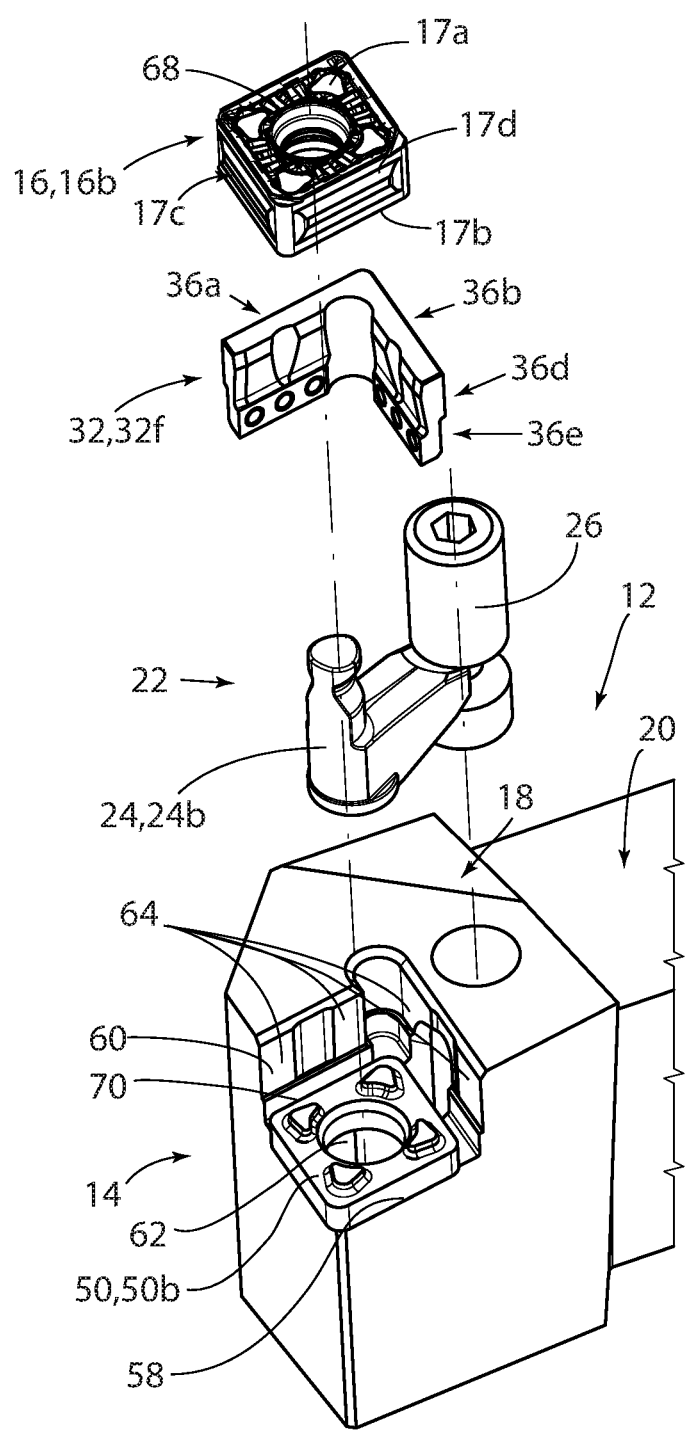
FIG. 47 is an isometric exploded view of the turning tool of FIG. 46.
Figure 48:
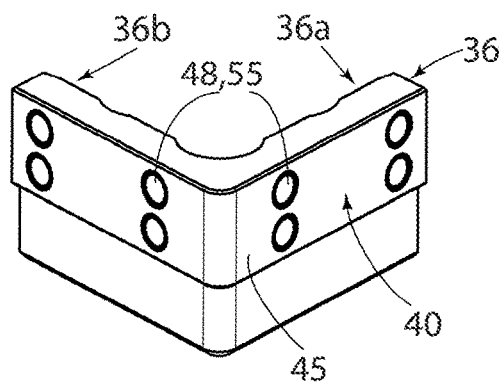
FIG. 48 is an isometric rear view of the insert adaptor of FIG. 46.
Figure 49:
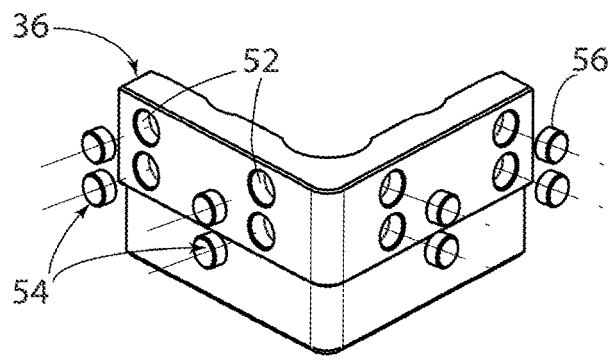
FIG. 49 is an isometric exploded rear view of the insert adaptor of FIG. 46.
Figure 50:
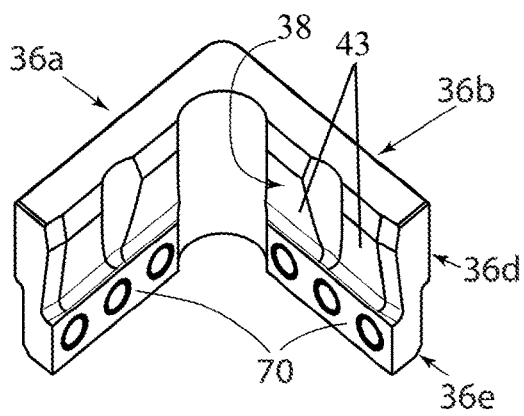
FIG. 50 is an isometric front view of the insert adaptor of FIG. 46.
Figure 51:
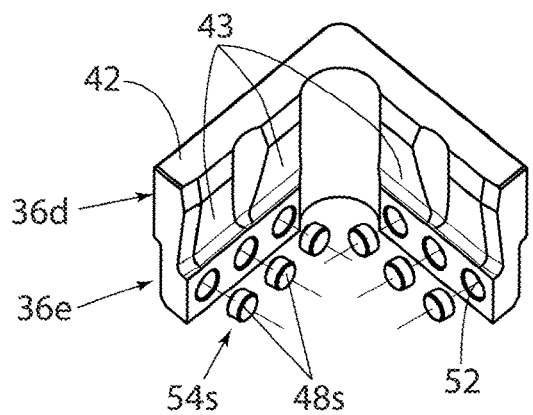
FIG. 51 is an isometric exploded front view of the insert adaptor of FIG. 46.
Figure 52:
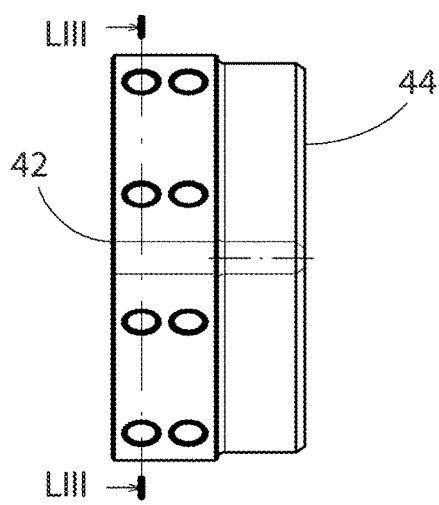
FIG. 52 is a rear view of insert adaptor of FIG. 46 showing an adaptor outer surface.
Figure 53:
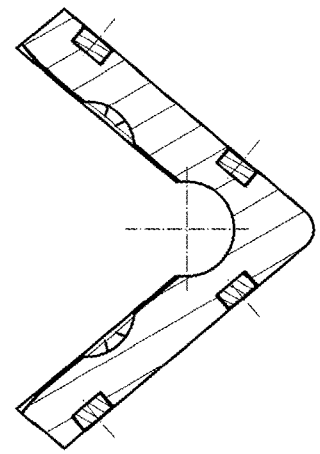
FIG. 53 is a cross-sectional view taken along lines LIII-LIII of FIG. 52.
Figure 54:
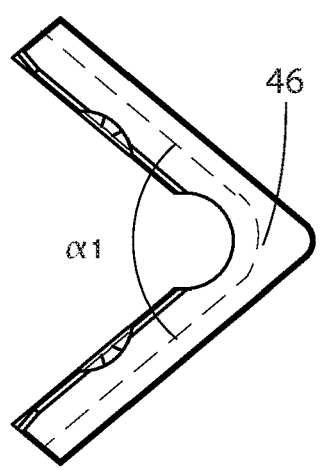
FIG. 54 is a top view of the insert adaptor of FIG. 46 showing hidden lines.
Figure 55:
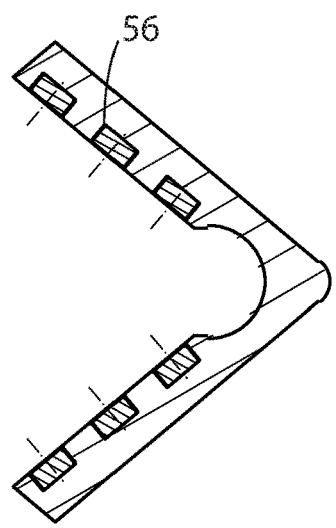
FIG. 55 is a cross-sectional view taken along lines LV-LV of FIG. 52.

Furthermore, according to the sixth embodiment, and as shown in FIG. 46, a peripheral surface of the shim 50b engages the shim abutment surface 70 of the insert adaptor 32.

It is also shown that the magnets 54 can be arranged in rows above each other for extra strength.

What is claimed is:

1. An insert adaptor configured to be magnetically retained in an insert pocket of a metal cutting tool, the insert adaptor comprising:
   opposite adaptor top and bottom surfaces;
   an adaptor peripheral surface in turn comprising opposing insert abutment and pocket abutment surfaces, the adaptor peripheral surface connecting the top and bottom surfaces; and
   an imaginary median plane bisecting the top and bottom surfaces;
   wherein:
   the insert adaptor is devoid of through holes configured to receive clamping screws, for securing the insert adaptor to the insert pocket;
   one of the insert abutment surface, pocket abutment surface and adaptor bottom surface, comprises a first magnetic surface configured to apply a magnetic attraction force sufficient to ensure that the insert adaptor remains in said insert pocket even when a cutting insert is not secured therein; and
   said first magnetic surface is configured to provide said magnetic attraction force by being formed with a first magnet recess, the insert adaptor further comprising a first magnet occupying the first magnet recess.

2. The insert adaptor according to claim 1, wherein said insert abutment surface comprises at least one abutment sub-surface projection.

3. The insert adaptor according to claim 2, wherein the insert adaptor comprises a first leg, and, in a top view of the insert adaptor, the first leg is straight; and, said at least one abutment sub-surface projection is at least two abutment sub-surface projections which are spaced-apart by an abutment-relief recess.

4. The insert adaptor according to claim 3, further comprising a second leg and, in a top view of the insert adaptor, the second leg is straight and non-parallel with the first leg; and, said second leg comprises at least two abutment sub-surface projections which are spaced-apart by an abutment-relief recess.

5. The insert adaptor according to claim 1, wherein the first magnetic surface is further formed with a second magnet recess, the insert adaptor further comprising a second magnet occupying the second magnet recess.

6. The insert adaptor according to claim 5, wherein the insert adaptor comprises a first leg, and, in a top view of the insert adaptor, the first leg is straight; and, both the first and second magnet recesses are located in the first leg.

7. The insert adaptor according to claim 1, wherein the first magnet is entirely embedded within the insert adaptor such that an outermost surface thereof is either flush with the first magnetic surface or is receded inside the adaptor therefrom.

8. The insert adaptor according to claim 1, wherein said first magnet recess is closer to the bottom surface than the top surface.

9. The insert adaptor according to claim 1, wherein a different one of the insert abutment surface, pocket abutment surface and adaptor bottom surface to the surface which comprises the first magnetic surface, comprises a second magnetic surface configured to apply a magnetic attraction force.

10. The insert adaptor according to claim 9, wherein said second magnetic surface is configured to provide said magnetic attraction force by being formed with a magnet recess, the insert adaptor further comprising a magnet occupying the recess.

11. The insert adaptor according to claim 1, wherein the insert adaptor is made of metal.

12. The insert adaptor according to claim 1, wherein the insert adaptor is configured to be elastically but not plastically deformable.

13. The insert adaptor according to claim 1, further being a lateral-insert adaptor having an elongated shape in which height dimension measured perpendicular to the medium plane is greater than a width dimension measured perpendicular to the height dimension and along the length direction of the lateral-insert adaptor.

14. A tool comprising:
an insert holder comprising a shank portion and a cutting portion extending therefrom;
the cutting portion is formed with an insert pocket;
the insert pocket is provided with a pocket base surface and at least one pocket support surface extending from the pocket base surface; and
the tool further comprising an insert adaptor according to claim 1 and an insert seated in the insert pocket;
wherein:
the insert abuts the insert abutment surface of the insert adaptor, and the pocket abutment surface of the insert adaptor abuts the insert pocket; and
the insert adaptor is retained in the insert pocket by said first magnetic surface and without clamping screws passing thorough the insert adaptor and into the insert pocket.

15. A tool according to claim 14, wherein the pocket abutment surface comprises the first magnetic surface, and the insert adaptor is thereby configured to be self-secured to insert pocket.

16. A tool according to claim 15, wherein the insert abutment surface or the adaptor bottom surface comprises a second magnetic surface configured to apply a magnetic attraction force, thereby configuring the insert adapter to be self-secured to insert pocket.

17. A tool according to claim 14, further comprising a shim located between the insert and the pocket base surface, wherein the first magnetic surface is the insert abutment surface adjacent the shim, thereby configuring the insert adapter to be self-secured to the shim.

18. A tool according to claim 14, wherein said first magnetic surface is the adaptor bottom surface thereby configuring the insert adapter to be secured to either the pocket base surface or a shim comprised by the tool and located between the insert adaptor and the pocket base surface.

19. A tool according to claim 14, further comprising a lever extending through the pocket base surface which is configured to secure the insert to the insert pocket.

20. A tool according to claim 14, further comprising a shim located between the insert and the pocket base surface, wherein the insert adaptor is made of metal and the shim is made of cemented carbide.

21. A tool according to claim 20, wherein the insert adaptor is made of steel.

22. A tool according to claim 14, wherein the insert adaptor is a lateral-insert adaptor configured to be located only between the insert and the at least one pocket support surface.

23. An insert adaptor configured to be magnetically retained in an insert pocket of a cutting tool, the insert adaptor comprising:
an adaptor body comprising:
first and second legs connected to one another and forming an adaptor angle ($\alpha 1$) in a top view of the insert adaptor;
an inner insert abutment surface formed on a first side of the first and second legs; and
an outer pocket abutment surface formed on a second side of the first and second legs, opposite to the first side of the first and second legs;
wherein:
on the first side of each of the first and second legs, the inner insert abutment surface comprises at least two abutment sub-surface projections which are spaced-apart by an abutment-relief recess;
on the second side of each of the first and second legs, the outer pocket abutment surface comprises at least one magnet recess formed therein;
a first magnet occupying the at least one magnet recess formed on the second side of the first leg; and
a second magnet occupying the at least one magnet recess formed on the second side of the second leg;
wherein:
the first and second magnets apply a magnetic attraction force sufficient to ensure that the insert adaptor is magnetically retained in said insert pocket even when a cutting insert is not secured in said insert pocket.

24. The insert adaptor according to claim 23, wherein the adaptor angle ($\alpha 1$) is acute.

* * * * *